United States Patent [19]

Brubaker

[11] 4,189,956
[45] Feb. 26, 1980

[54] REMOTE CONTROL MIRROR

[75] Inventor: James E. Brubaker, Greenville, Ohio

[73] Assignee: Sheller-Globe Corporation, Toledo, Ohio

[21] Appl. No.: 861,835

[22] Filed: Dec. 19, 1977

[51] Int. Cl.$^2$ .............................................. G05G 1/00
[52] U.S. Cl. .................................. 74/501 M; 74/501 P
[58] Field of Search ............. 74/501 M, 501 R, 501 P

[56] References Cited

U.S. PATENT DOCUMENTS

| 3,561,283 | 2/1971 | Smith | 74/501 M |
| 4,072,065 | 2/1978 | Perrella | 74/501 M |
| 4,142,424 | 3/1979 | Klein | 74/501 M |

Primary Examiner—Samuel Scott
Assistant Examiner—G. Anderson
Attorney, Agent, or Firm—Barnes, Kisselle, Raisch & Choate

[57] ABSTRACT

A remote control mirror, comprising a mirror support, a base having a projection fixed thereto and extending therefrom. The mirror support has a groove into which the projection extends. The groove has a bottom which is arcuate both longitudinally and transversely of the groove. The curvature of the groove longitudinally is greater than the curvature of the groove transversely. In one form, the projection has at least two contact areas engaging the groove, which have a lesser extends of curvature than the groove in a direction transversely of the groove. In another form, the two areas form a part of the projection.

7 Claims, 7 Drawing Figures

REMOTE CONTROL MIRROR

This invention relates to remote control mirrors.

BACKGROUND OF THE INVENTION

In a common type of remote controlled mirror used on automobiles and the like, the mirror is supported on a mirror support that is usually mounted on a base by a ball and socket connection and spaced cables extend from the mirror support to a remote control for operating and adjusting the mirror support and, in turn, the mirror. One of the problems with such a mirror, especially where the mirror is generally rectangular rather than circular, is that the mirror tends to vibrate and rotate in the plane of the mirror. It has heretofore been suggested that spaced projections be provided on the mirror support which extend into openings of a plastic device to tend to prevent rotation of the mirror in the plane of the mirror. However, such a construction has not proven completely satisfactory. Specifically, mirror travel is restricted in the 1:30, 4:30, 7:30 and 10:30 clock positions of the mirror.

In U.S. Pat. No. 3,780,598, having a common assignee of the present application, there is disclosed a remote control mirror comprising a mirror support, a base, a trunnion, inter-engaging means between the trunnion and the base limiting the pivotal movement of the trunnion with respect to the base in a single plane about a first axis, and interengaging means between the trunnion and the mirror support limiting movement of the mirror support about a second axis at a right angle to the first-mentioned axis and cable means acting on said mirror back for selectively moving said mirror back into any desired position by the combined pivotal movement about each of said axes.

The aforementioned remote control mirror satisfactorily obviates the problems with respect to prior art mirrors. However, it necessitates the use of a separate trunnion.

Accordingly, the present invention is directed to a remote control mirror which obviates the need for a separate trunnion.

SUMMARY OF THE INVENTION

In accordance with the invention, the mirror base has a projection fixed thereto and extending therefrom, and the mirror support has a groove into which the said projection extends. The groove has a base which is arcuate both longitudinally and transversely of the groove and the curvature of the groove longitudinally is greater than the curvature of the groove transversely. The projection has at least two contact areas engaging the groove, which have a lesser extent of curvature than the grooves in a direction transversely of the groove.

DESCRIPTION

Figure 1:
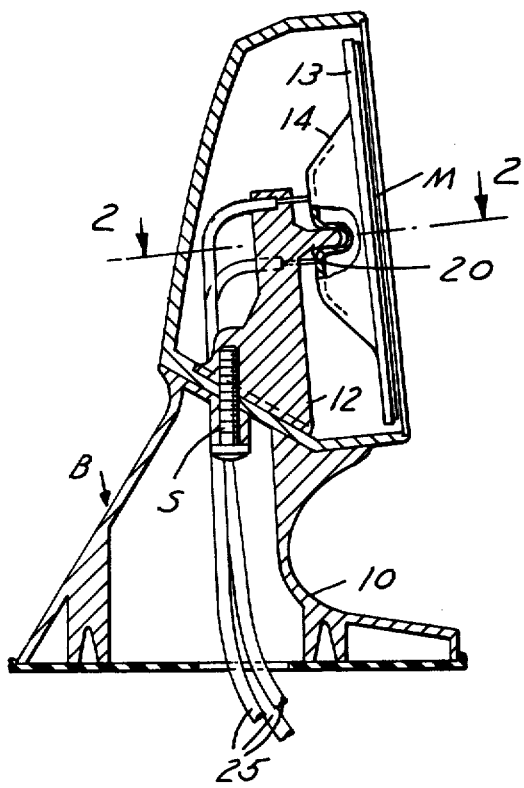
FIG. 1 is a sectional view of a remote control mirror embodying the invention.
Figure 2:
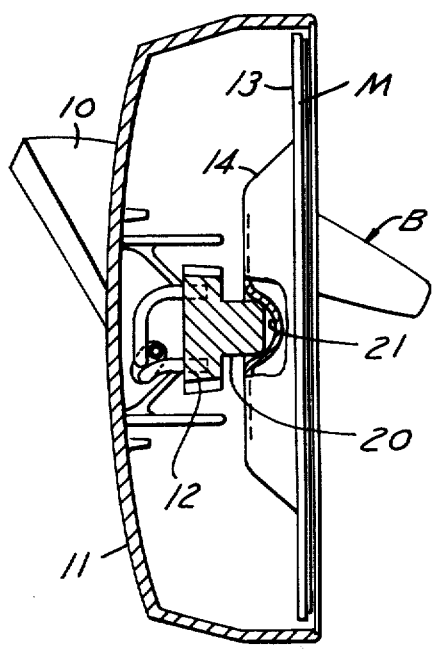
FIG. 2 is a sectional view taken along the line 2—2 in FIG. 1.

Referring to FIGS. 1 and 2, the mirror embodying the invention comprises a metal base B including a stanchion 10 which is adapted to be fixed to the exterior of the vehicle, for example, on the door and a metal base bracket 12 fixed on the base. A metal shell 11 is interposed between stanchion 10 and base bracket 12 surrounding base bracket 12. Stanchion 10, shell 11 and base bracket 12 are held in assembled relation by a screw S.

The mirror M of flat glass or the like, is generally rectangular and is fixed on a metal mirror support 13 having a central portion 14 spaced from the flat mirror.

Figure 3:
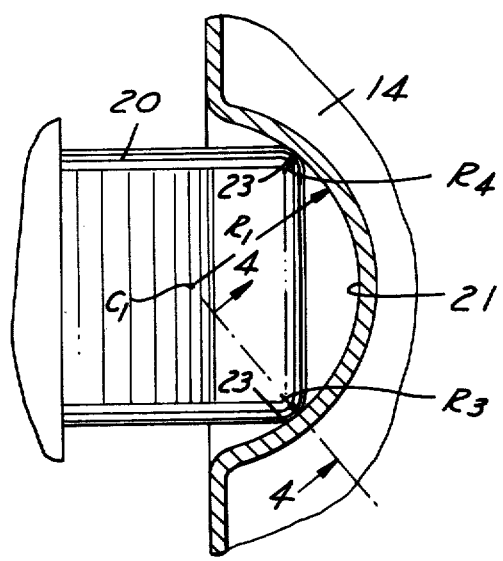
FIG. 3 is a fragmentary view on an enlarged scale of a portion of a mirror shown in FIG. 1.
Figure 4:
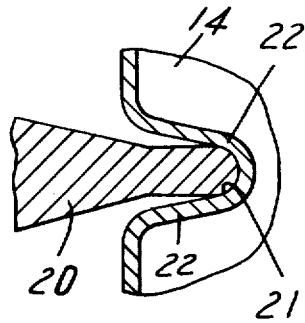
FIG. 4 is a fragmentary sectional view taken along the line 4—4 in FIG. 3.

In accordance with the invention, a projection 20 is provided in fixed and integral relation to the base bracket 12 and extends into a groove 21 in the back of the mirror support. The groove 21 is arcuate both not longitudinally and transversely, the curvature being greater longitudinally than transversely. As shown in FIG. 3, the curvature of the groove 21 longitudinally is constant having a radius $R_1$ and the angular extent of the groove longitudinally is less than 180° with respect to the center $C_1$ of radius. The groove 21 has a constant transverse radius of curvature $R_2$ which is less than 180° and flares outwardly as at 22. The projection has two spaced contact areas 23, each of which is curved longitudinally and transversely with respect to the groove, the radius of curvature $R_3$ being less than the radius of curvature $R_1$ of the groove and the radius of curvature $R_4$ of the contact area being substantially equal to the radius of curvature $R_2$ of the groove transversely.

In accordance with conventional practice, three wires 25 of Bowden cables extend to a control, not shown, so that manipulation of the cables tilt the mirror to the desired angle.

In order to control the angular position of the mirror M relative to the base B, the remote control is moved to, in turn, move the cables and swing the mirror support longitudinally or transversely relative to the projection 20. When the cables are operated to move the mirror support longitudinally of the projection 20, the groove 21 moves along the length. When the cables are operated to swing the mirror support transversely relative to the base, the groove 21 moves transversely of the projection 20.

It can thus be seen that the construction provides for an efficient control of the mirror without vibration or similar movement, permitting a compact construction, and one that is easily assembled.

Figure 6:
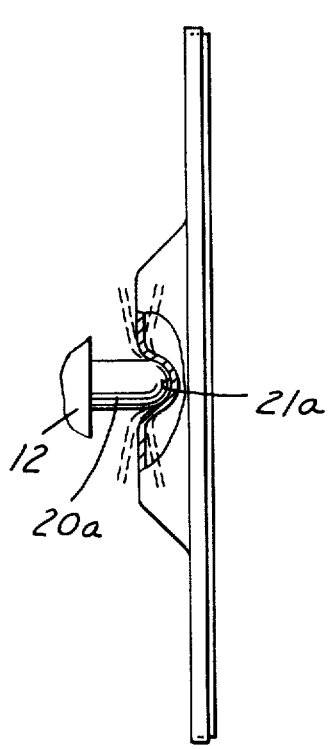
FIG. 6 is a fragmentary view similar to FIG. 4 of the modified form of the mirror.
Figure 7:
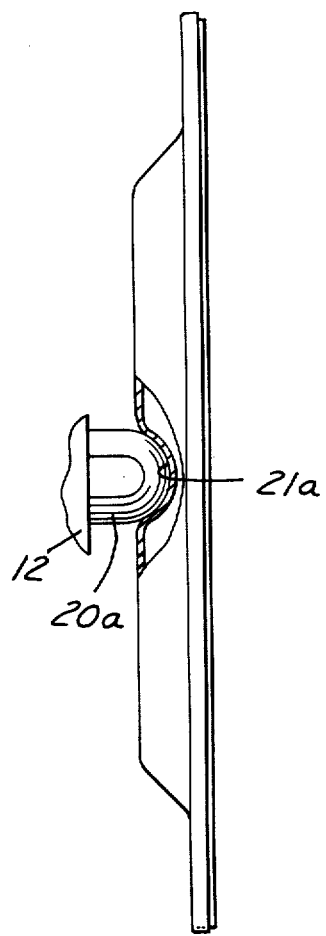
FIG. 7 is a fragmentary view similar to FIG. 1 of the modified form of the mirror.
Figure 5:
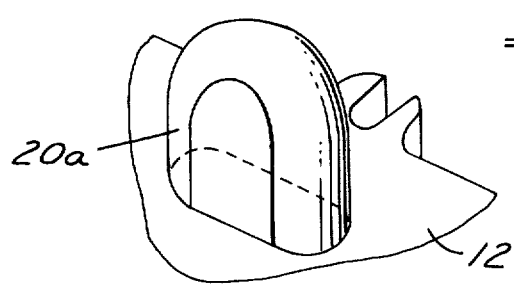
FIG. 5 is a fragmentary perspective view of a portion of a modified form of the mirror.

In the form of the invention shown in FIGS. 5–7, the projection 20a is constructed so that the two contact areas for a part of a continuous contact surface 26 in engagement with the groove 21a, that is, the two contact areas of the form of the invention shown in FIGS. 1–4 form part of a single surface 26 that has the same curvilinear relationships to the groove 21a.

Thus, the construction embodying the invention involves no loose parts resulting in substantial cost savings. The components can be made of metal castings, plastic moldings or metal stampings. Where there is metal to plastic contact, there is no need for lubrication. In the form of the invention utilizing two spaced contact areas, less resistance to movement occurs resulting is a more efficient travel of the mirror.

I claim:

1. In a remote control mirror, the combination comprising
    a mirror support,
    a base,
    said base having a projection fixed thereto and extending therefrom,
    said mirror support having a groove into which said projection extends,
    said groove having a configuration which is arcuate both longitudinally and transversely of the groove,
    the radius of curvature of the groove longitudinally being greater than the radius of curvature of the groove transversely,
    said projection having at least two curved contact areas engaging said groove,
    said contact areas of the projection having a lesser radius of curvature than the radius of curvature of the groove in a direction transversely of the groove.

2. The combination set forth in claim 1 wherein the base of said groove has a constant radius of curvature longitudinally and a constant radius of curvature transversely.

3. The combination set forth in claim 2 wherein the radius of the curvature of said contact areas of said projection in a direction transversely of the groove are substantially equal to the radius of the groove transversely thereof.

4. The combination set forth in claim 3 wherein the angle subtended by the length of the groove is less than 180° longitudinally thereof with respect to the center of the radius thereof.

5. The combination set forth in claim 3 wherein the angular extent of the groove transversely thereof is less than 180° with respect to the center of radius thereof.

6. The combination set forth in claim 1 wherein the two contact areas of said projection comprise portions of a single arcuate surface.

7. In a remote control mirror, the combination comprising
    a mirror support,
    a base,
    said base having a projection fixed thereto and extending therefrom,
    said mirror support having a groove into which said projection extends,
    said groove having a configuration which is arcuate both longitudinally and transversely of the groove,
    the radius of curvature of the groove longitudinally being greater than the radius of curvature of the groove transversely,
    said groove having a constant radius of curvature longitudinally and a constant radius of curvature transversely,
    said projection having at least two contact areas engaging said groove,
    said contact areas of the projection having a lesser radius of curvature in a direction longitudinally of the groove,
    the radius of the curvature of said contact areas of said projection in a direction transversely of the groove being substantially equal to the radius of the groove transversely thereof,
    the angles subtended by the length of the groove being less than 180° longitudinally and transversely thereof with respect to the radii thereof,
    the angular extent of the groove transversely thereof being less than 180° with respect to the center of radius thereof.

* * * * *